United States Patent [19]

Peck

[11] 4,143,633

[45] Mar. 13, 1979

[54] CRANKSHAFT TRIGGER WHEEL

[75] Inventor: Gordon H. Peck, Las Cruces, N. Mex.

[73] Assignee: Autotronic Controls Corporation, El Paso, Tex.

[21] Appl. No.: 764,417

[22] Filed: Jan. 31, 1977

[51] Int. Cl.$^2$ .......................... F02P 1/02; H02K 39/00

[52] U.S. Cl. .......................... 123/148 E; 123/146.5 A; 310/168; 310/111

[58] Field of Search ........ 123/148 E, 117 R, 146.5 A; 328/5; 310/111, 168

[56] References Cited

U.S. PATENT DOCUMENTS

| | | | |
|---|---|---|---|
| 3,219,878 | 11/1965 | Konopa | 123/148 E |
| 3,357,416 | 12/1967 | Huntzinger | 123/148 E |
| 3,473,061 | 10/1969 | Soehner et al. | 123/148 E |
| 3,482,560 | 12/1969 | Höhne | 123/148 E |
| 4,026,251 | 5/1977 | Schweitzer et al. | 123/148 E |

FOREIGN PATENT DOCUMENTS

| | | | |
|---|---|---|---|
| 755900 | 9/1953 | Fed. Rep. of Germany | 310/168 |

*Primary Examiner*—Charles J. Myhre
*Assistant Examiner*—P. S. Lall
*Attorney, Agent, or Firm*—Marcus L. Bates

[57] ABSTRACT

An improved crankshaft trigger wheel for use in an ignition system for an internal combustion engine. The configuration of the trigger wheel provides a high degree of electrical noise immunity, provides a single piece construction which has the dual function of a trigger wheel as well as an engine harmonic balancer. The wheel is made into a configuration which is easily shaped during manufacture, and provides a wheel shape which produces a higher degree of timing accuracy. The wheel of the present invention has an outer, circumferentially extending surface interrupted by corners, with the corners being defined by two adjacent arcs, wherein each arc has a radius which is greater than the radius of a circle described by the rotating wheel.

8 Claims, 11 Drawing Figures

CRANKSHAFT TRIGGER WHEEL

BACKGROUND OF THE INVENTION

Maximum power can only be obtained from an internal combustion engine if the ignition timing is correct. Any timing fluctuation between cylinders (spark scatter) or timing fluctuation at a single cylinder (spark jitter) reduces the power output of the engine. Common causes of timing fluctuation are the flexing and end play of the engine camshaft; distributor gas "play"; distributor point cam inaccuracies; distributor point bounce and wear; timing chain and gear wear; and false ignition triggering. These inaccuracies are particularly important in high performance, high RPM engines, because these engines normally utilize the maximum advance possible before pre-ignition occurs. Precise ignition timing allows this advance limit to be more closely approached.

Ordinary prior distributors commonly exhibit timing inaccuracies of several degrees, particularly at high RPM. Point bounce has been eliminated through the use of magnetic pulse distributors and the points cam has been eliminated, but the remaining causes of ignition timing inaccuracies are still present and create significant timing errors.

An effort to solve these problems and produce precision timing pulses haa been undertaken by several manufacturers. The solution is general has been the substitution or addition of a crankshaft trigger wheel. The wheel is usually attached to the engine crankshaft directly by bolting it to the engine's harmonic balancer. The wheel of the prior art is usually made of aluminum with four ferrous steel tabs located 90° apart (for an eight cylinder engine) on the wheel outer perimeter. Others have employed ferrous steel with teeth or notches radially spaced around the perimeter. A magnetic pickup is located in a selected fixed position in close proximity to the tabs, teeth, or notches so that a suitable electrical pulse is generated in the magnetic pickup as the tab passes near the pickup during crankshaft rotation. The resultant pulses are used to trigger an electronic ignition system which in turn produces the high voltage ignition pulses used to ignite the combustion mixture. The prior art crank trigger wheels provide a substantially higher degree of timing accuracy than conventional distributor system; however, they still possess several negative characteristics. The most serious of these is the lack of sufficient noise immunity in order to prevent false ignition triggering, a major cause of drastic ignition timing inaccuracy. Another shortcoming of crankshaft trigger wheels of the prior art is the two piece construction utilized with aluminum wheels. These wheels use steel tabs or pins as stated above which can loosen and therefore create timing jitter or become completely separated from the wheel.

SUMMARY OF THE INVENTION

The present invention provides a crankshaft trigger wheel made from ferrous metal shaped to produce a high electrical noise immunity wave form when combined with a conventional magnetic pickup.

More specifically, this invention provides a trigger wheel which has an outer, circumferentially extending surface interrupted by the intersection of corners, with the corners being defined by two adjacent arcs, with each arc having a radius greater than the radius of an imaginary circle described by rotating the wheel about its central axis. The intersection of the arcs occur on the imaginary circle. This provides the outer peripheral surface of the wheel with a varying radius deviation, with 0.125" maximum deviation being preferred. The wheel of the present invention can be substituted for the harmonic balancer located on the end of the crankshaft of an internal combustion engine.

Accordingly, a primary object of the present invention is the provision of a crankshaft trigger wheel shaped to produce a high electrical noise immunity wave form.

Another object of the invention is the provision of a trigger wheel in combination with a conventional magnetic pickup of an ignition system for an internal combustion engine.

A further object of the present invention is to disclose and provide a crankshaft trigger wheel for providing a signal by which a high tension electrical voltage is developed for the spark plug of an internal combustion engine.

A still further object of the present invention is to provide a wheel device having projections thereon in combination with a magnetic pickup for providing a signal having high electrical noise immunity.

Another and still further object of the present invention is the provision of a combination crankshaft, harmonic balancer, and trigger wheel for use in an ignition system which improves the ignition timing in an internal combustion engine.

The above objects are attained in accordance with the present invention by the provision of apparatus fabricated in a manner substantially as described in the above abstract and summary.

These and various other objects and advantages of the invention will become readily apparent to those skilled in the art upon reading the following detailed description and claims and by referring to the accompanying drawings.

DETAILED DESCRIPTION OF THE PREFERRED EMBODIMENT

Figure 1:
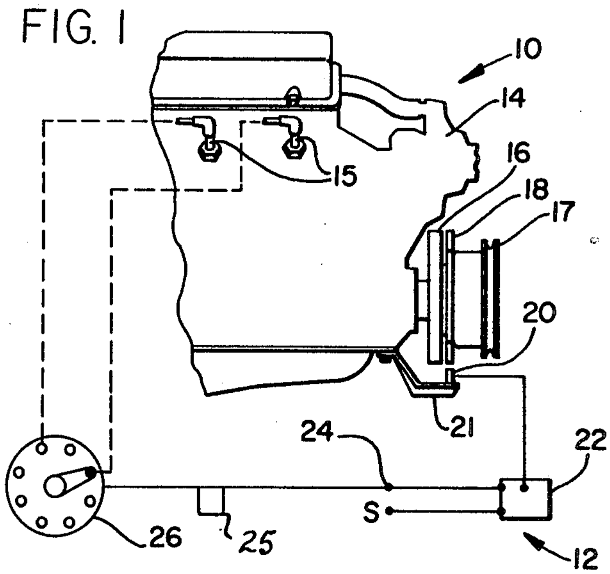
FIG. 1 is a part schematical, part diagrammatical broken view of an ignition system together with an internal combustion engine wherein the system includes a crankshaft trigger wheel made in accordance with the present invention.

FIG. 1 discloses a combination 10 comprised of an ignition system and an internal combustion engine. An ignition system 12 is connected to the internal combustion engine 14 in such a manner that the spark plugs 15 are fired in proper sequential order. A harmonic balancer 16 is connected to the illustrated crankshaft of the engine, and the usual pulley 17 is spaced from the balancer by a crankshaft trigger wheel 18 made in accordance with the present invention. Accordingly, the trigger wheel 18 is concentrically arranged respective to the shaft, balancer, and pulley assembly.

A magnetic pickup 20 is mounted at 21 in slightly spaced relation from the outer peripheral surface of the wheel 18 and thereby provides an improved electrical signal for the multiple strike discharge circuitry 22, hereinafter referred to as "MSD".

The MSD circuitry 22 preferably is made in accordance with U.S. Pat. No. 3,926,165.

The apparatus 22 is connected to a suitable source S of current and the output 24 thereof is connected to a conventional ignition coil 25 and distributor 26, which in turn conducts high voltage current from 24 to each of the spark plugs 15.

Figure 2:
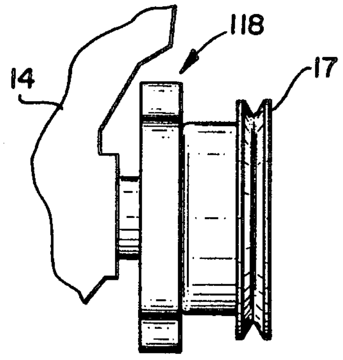
FIG. 2 is a fragmented, enlarged, side elevational view of a modification of the apparatus disclosed in FIG. 1.

In the illustration of FIG. 2, the crankshaft, harmonic balancer, and trigger wheel have been combined into a unitary device in the form of the illustrated trigger wheel 118. This expedient enables the engine manufacturer to advantageously equip the internal combustion engine 14 with the trigger wheel of the present invention at the factory rather than retro-fitting the engine at some subsequent date.

Figure 3:
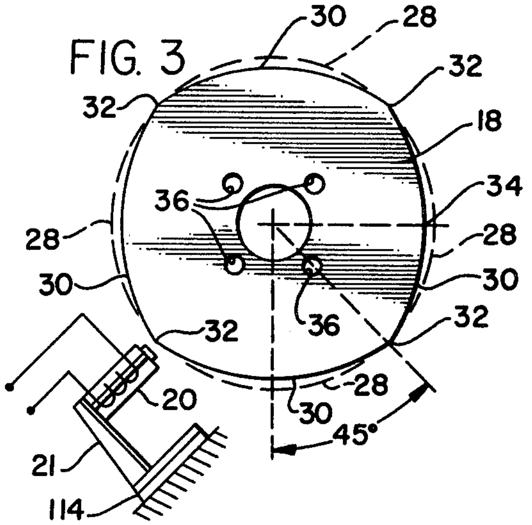
FIG. 3 is a plan view of a crankshaft trigger wheel made in accordance with the present invention.

FIG. 3 discloses a plan view of either of the trigger wheels disclosed in the foregoing figures. As seen in FIG. 3, the wheel rotates to describe an imaginary circle having a diameter 28. Arcs 30 form a marginal, circumferentially extending periphery of the wheel and are described by a radius which is greater than the radius which describes outside diameter 28. The adjacency of arcs 30 describe a corner 32 which could aslo be termed an intersection or protrusion. Corners 32 are radially spaced 90° from one another for a four cycle, eight cylinder engine, while 45° from each corner there is seen a point of maximum deviation 34 of of the wheel surface.

Apertures 36 provide a bolt circle by which the centrally apertured trigger wheel can be securely affixed to the marginal end of the crankshaft.

Figure 5:
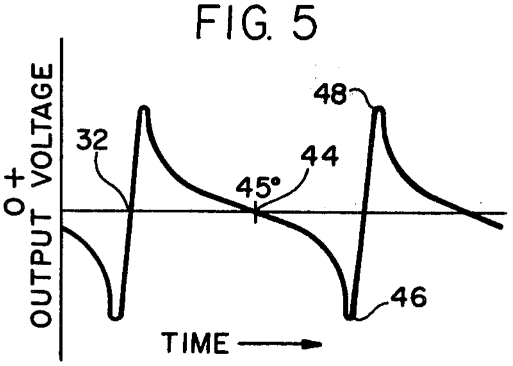
FIG. 5 is a wave form made by the apparatus disclosed in the foregoing figures.

FIG. 5 discloses a wave form which describes the output voltage of the magnetic pickup 20. Numeral 44 indicates a position 34 which is 45° from a corner 32, while numerals 46 and 48 indicate the magnitude of the voltage of the wave form.

Figure 6:
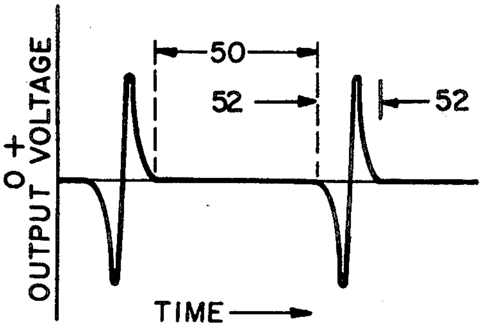
FIG. 6 PRIOR ART
FIG. 6 is a wave form generated according to prior art expedients.

In the prior art illustration of FIG. 6, it will be noted that there is a substantial amount of time 50 during which the output voltage of a magnetic pickup is zero. Numeral 52 indicates the time during which the output voltage is other than zero.

Figure 7:
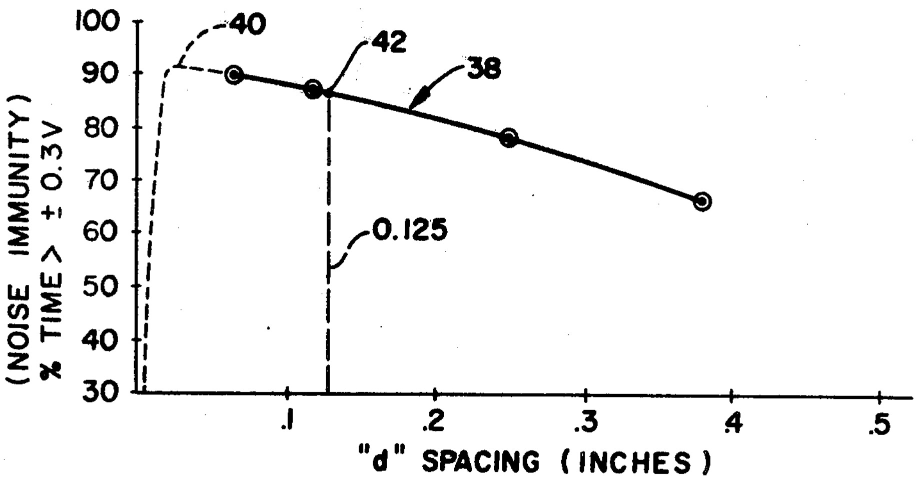
FIG. 7 is a curve illustrating the effect of changing one variable respective to the present invention.

FIG. 7 discloses a curve 38 which relates spacing in inches to noise immunity shown to the left of the figure. In particular, FIG. 7 discloses the effect of varying the deviation 34 with respect to noise immunity.

Figure 8:
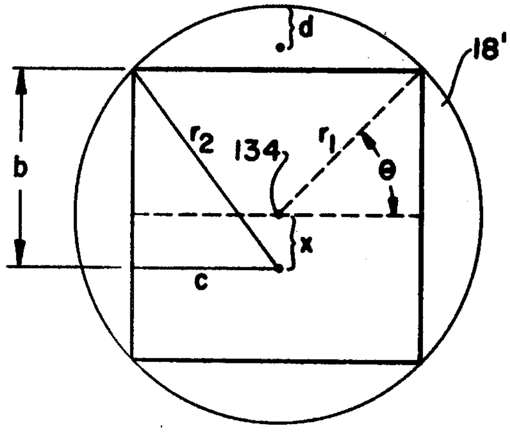
FIG. 8 is a diagrammatical illustration related to the fabrication of the present invention.

FIG. 8 discloses one means by which a trigger wheel of the present invention can be fabricated. As seen in FIG. 8, a circular metal plate 18' is provided, having a center 134 and a radius $r_1$. d is the maximum radius deviation from a circle desired in the trigger wheel. x is the distance from the center of the circle from which one side of the wheel shape is defined. b is the side opposite, while c is the side adjacent of adjacent of a 90° triangle having a hypotenuse $r_2$. The angle theta depends upon the number of cylinders associated with the internal combustion engine as well as the number of strokes per cycle.

Figure 9:
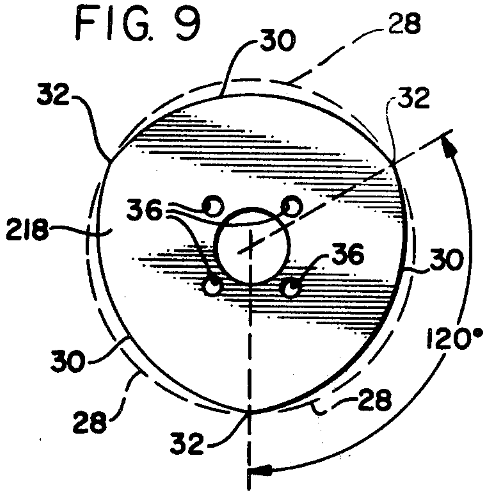
FIG. 9 is a modification of the apparatus disclosed in FIG. 3.

FIG. 9 discloses a trigger wheel for a six cylinder, four stroke engine wherein the corners are placed 120° apart. The radius deviation is illustrated between numerals 28 and 30.

Figure 10:
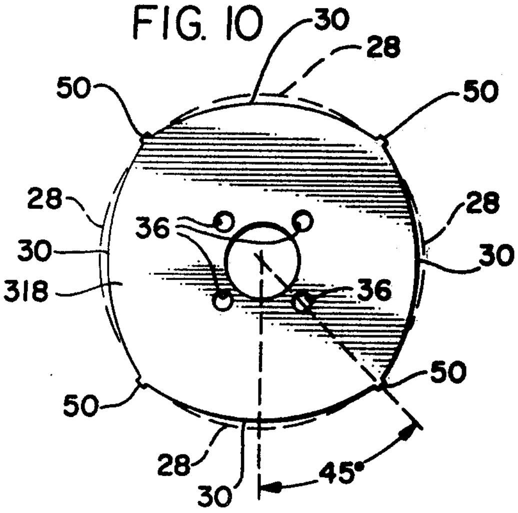
FIG. 10 is a 2*of modification 2*apparatus in FIG. 3.

FIG. 10 illustrates still another modification of the present invention wherein protrusions 50 have been included at the corners or intersect of the adjacent arcs 28. Accordingly, the protrusions 50 provide for improved engine starting characteristics while at the same time the low noise immunity obtained from the deviation 28–30 is realized by this embodiment of the invention.

OPERATION

Figure 4:
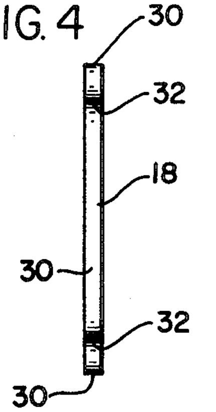
FIG. 4 is a side view of the apparatus disclosed in FIG. 3.

The purpose of this invention is to provide a crankshaft trigger wheel made from ferrous metal. The wheel is uniquely shaped to produce an unexpected high electrical noise immunity waveform when combined with a conventional magnetic pickup. The wheel for an eight cylinder engine is shown in the drawing in FIGS. 3 and 4.

As seen in FIGS. 3 and 5, as the surface of the wheel gets closer to or further away from the magnetic pickup during wheel rotation, the pickup magnetic field is disturbed, thereby establishing a magnetic flux which results in a voltage. The flux is virtually continuous since the distance from the magnetic pickup to the surface of the wheel is continuously varying. The only time a zero voltage is produced is when the direction of the flux is reversed. This occurs at eight points around the wheel as indicated in FIG. 3. The maximum flux is created when the "corners" of the wheel have rotated closest to the magnetic pickup. As a corner passes the magnetic pickup the direction of flux is reversed yielding a voltage of opposite polarity. In FIG. 5, the amplitude 46, 48 of this voltage is extended with time since flux is still present due to the gradual, continuously changing proximity of the wheel'surface in relationship to the magnetic pickup. As the wheel rotates past the position 45° from the corner the flux direction reverses and creates a voltage which is opposite in polarity. The voltage amplitude increases until the next corner passes the magnetic pickup and the flux is again reversed. This process continues as the wheel rotates. The resultant waveform possesses high noise immunity since electrical noise normally capable of false triggering an ignition system becomes an integral part of the basic high level signal and therefore is not sufficiently distinguished to establish a separate trigger signal.

By comparison, a typical conventional crank trigger wheel waveform is shown in FIG. 6. The flux is abrupt produced and very little noise immunity is exhibited. During the zero voltage time any electrical noise with sufficient amplitude (typically 0.3v or greater) can false trigger the controlled ignition.

The geometrical technique for determining the crank-shaft trigger wheel dimensions for a given wheel thickness, maximum diameter and maximum radius deviation from a circle is shown in FIG. 8. The wheel thickness was not found to be a critical parameter. Several thicknesses were found to exhibit substantially identical characteristics. The wheel maximum diameter dimension ($2r_1$) should be large enough to easily obtain geometrical accuracy, thereby minimizing the effect of construction errors. The maximum radius deviation from a circle (dimension d) is selected to produce the desired noise immunity. For a given radius ($r_1$), as the dimension d is decreased, the noise immunity increases until finally a change to no noise immunity is reached due to the wheel shape become a circle. This relationship is shown graphically in FIG. 7. The dimension d of approximately ⅛ inch was found to be satisfactory because it provided high noise immunity, retention of a low RPM capability, and the distance between the wheel corners is sufficiently spaced from the magnetic pickup to render the surface texture of the wheel noncritical.

Irregularities on the the wheel surface can create self induced electrical noise spikes if the outer wheel surface is positioned too close to the magnetic pickup during rotation. This is especially so in the region mid-way between two wheel corners where the noise immunity is at a minimum value.

The following derivations show that the wheel shape is defined by dimension "d" and "$r_1$".

Let $r_1=\frac{1}{2}$ the maximum diameter of the wheel

Let d= maximum radius deviation from a circle

Then $r_2^2=b^2+c^2$ $r_2=\sqrt{b^2+c^2}$

Also $r_2=r_1-d+x$

And $b=x+r_1\cos\theta=x+r_1\cos 45°$ for eight cylinders.

Or $x=b-r_1\cos\theta$

And $c=r_1\cos 45°$ $\therefore\sqrt{b^2+c^2}=r_1-d+x$

Let $y==r_1-d$

Then $b^2+c^2=(y+x)^2$ $b^2+c^2=y^2+2xy+x^2$ $b+c^2=(r_1-d)^2+2x(r_1-d)+2x^2$
$={r_1}^2-2r_1d+d^2+2xr_1-2xd+x^2$ $b^2+(r_1\cos 45°)^2=r_1^2-2r_1^d+d^2+2r_1(b-r_1\cos 45°)-2d(b-r_1\cos 45°)+b^2-2br_1\cos 45°+(r_1\cos 45°)^2$ $(r_1\cos 45°)^2=r_1^2-2r_1d+d^2+2r_1b-2r_1^2\cos 45°-2db+2dr_1\cos 45°-2br_1\cos 45°+(r_1\cos 45°)^2$ $-2r_1b+2db+2br_1\cos 45°=r_1^2-2r_1d+d^2-2r_1^2\cos 45°+2dr_1\cos 45°+(r_1\cos 45°)^2-(r_1\cos 45°)^2$ $$2r_1b\left(-1+\frac{d}{r}+\cos 45°\right)=2r_1\left(\frac{r_1}{2}-d+\frac{d^2}{2r_1}-r_1\cos 45°+d\cos 45°\right)$$

$$b=\frac{\frac{r_1}{2}+\frac{d^2}{2r_1}-d-r_1\cos 45°+d\cos 45°}{\cos 45°+\frac{d}{r}-1}$$

-continued $$b=\frac{r_1+\frac{d^2}{r_1}-2d-2\cos 45°(r_1-d)}{2\left(\cos 45°+\frac{d}{r_1}-1\right)}$$

solving for x and $r_2$, $x=b-r_1\cos 45°$ $r_2=r_1-d+x=r_1-d+b-r_1\cos 45°$

As $r_2$ is rotated about the point defined by the distance x from the center of the circle one side of the wheel shape is defined. The other three sides are defined by relocating the point defined by the distance x from the circle in 90° increments and rotating $r_2$ about each point.

The maximum radial deviation can vary from a value almost approaching a circle up to a value almost approaching the radius of a wheel; but for practical purposes, Aplicant prefers to limit the maximum radial deviation to a value between the limits of 0.02 to 0.9 inches. The value of 0.02 is selected in accordance with the curve of FIG. 7. The value of 0.9 is selected because reasonable noise immunity is achieved within this limit.

The six cylinder wheel of FIG. 9 contains three corners. This produces a trigger pulse every 120° of crankshaft rotation instead of every 90° as in the before mentioned eight cylinder engine.

The four cylinder wheel (not shown) contains two corners. This produces a trigger pulse every 180° of crankshaft rotation.

Figure 11:
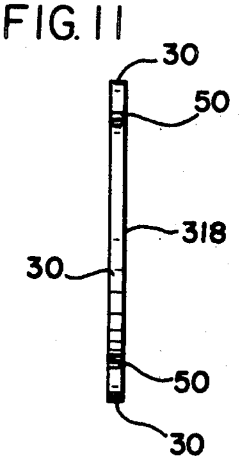
FIG. 11 is a side view of the apparatus disclosed in FIG. 10.

FIGS. 10 and 11 disclose a wheel which is advantageously used when a lower RPM triggering capability is desired. Small ferrous metal tabs 50 are included at each corner. The tab positions establish the triggering points and the gradually varying wheel radius 30 between the corners increases the noise immunity by adding to the basic magnetic pickup output signal created by the tabs.

The present invention can be applied to two or four stroke engines using any number of cylinders. Additional applications include all rotating mechanisms where high noise immunity timing or pulse detection is desired.

I claim:

1. In an internal combustion engine having an ignition system which fires a spark plug of each combustion chamber thereof in timed sequence respective to the position of the crankshaft, the combination with said ignition system of a crankshaft trigger wheel by which a timed signal is generated for causing the ignition system to sequentially fire each spark plug;

said trigger wheel is concentrically received in attached relationship respective to one end of the crankshaft with the central axis of the wheel coinciding with the central axis of the crankshaft;

said trigger wheel having an outermost, circumferentially extending surface area defined by a plurality of intersecting arcs, said arcs being arranged adjacent to one another, each arc having a radius which is greater than the radius generated when the wheel is rotated about its central axis to thereby provide a corner at the termination of each arc;

the radius of curvature of the intersecting arcs for a given maximum radial deviation and wheel maximum diameter is of a value such that the intersection of said adjacent arcs falls upon the radius of the circle generated when the wheel is rotated about its axial centerline; said maximum radial deviation is equal to 0.02 to 0.9 inches;

a pickup coil, means mounting said coil adjacent to the outer periphery of the wheel such that rotation of the wheel successively brings each corner thereof into close proximity of said coil to thereby induce a varying voltage thereinto as the wheel is rotated about its central axis.

2. The combination of claim 1 wherein said maximum radial deviation is equal to 0.125 inches.

3. The combination of claim 1 wherein said corners are ⅛ inch greater in radius than the smallest radial distance measured about the wheel.

4. The combination of claim 1 wherein said wheel is also the crankshaft harmonic balancer.

5. An ignition system for an internal combustion engine, said system includes a pickup coil and a rotating wheel, wherein the wheel is concentrically received in attached relationship respective to the engine shaft, said wheel having an outermost, circumferentially extending, peripheral surface area which includes radially spaced corners formed thereon for varying the inductance within the pickup coil so that the coil can produce a signal by which the ignition system can produce a high tension spark;

said rotating wheel having an axial centerline which coincides with the axial centerline of the shaft, said corners being defined by adjacent arcs; each said arc having a radius which is greater than the radius of the greatest circle described by the rotating wheel;

the radius of curvature of the intersecting arcs for a maximum radial deviation and wheel maximum diameter is of a value such that the intersection of two adjacent arcs falls upon the radius of the circle; and, the outer peripheral surface of the wheel has a maximum deviation between the limits of 0.02 and 0.9 inches from a circle.

6. The improvement of claim 5 wherein the outer peripheral surface of the wheel has a radial deviation of0.125 inches from a circle.

7. The improvement of claim 5 wherein said wheel is also the crankshaft harmonic balancer.

8. In an ignition system for an internal combustion engine wherein said system includes a pickup coil and a rotating wheel with the wheel being concentrically received by the engine shaft and having an outer periphery which includes projections formed thereon for varying the inductance within said pickup coil so that the coil can produce a signal by which the ignition system can produce a high tension spark, the improvement comprising:

said rotating wheel having an outer, circumferentially extending surface comprised of a plurality of arcs which form radially spaced corners at the joinder of the arcs; said corners being defined by two of said arcs; each said arc defining a marginal, outer peripheral surface area of the wheel so that the spaced distance between the wheel outer surface and the coil continuously changes as the wheel is rotated; each said arc has a radius of curvature which is greater than the radius of a circle described by the outermost part of the rotating wheel;

the outerperipheral surface of the wheel has a maximum deviation between the limits of 0.02 to 0.9 inches from a circle; and, for a given maximum radial deviation and wheel maximum diameter, the radius of curvature of the intersecting arcs is of a value such that the intersection of two adjacent arc falls upon the radius of the circle.

* * * * *

UNITED STATES PATENT OFFICE

CERTIFICATE OF CORRECTION

Patent No. 4,143,633 Dated March 13, 1979

Inventor(s) GORDON H. PECK

It is certified that error appears in the above-identified patent and that said Letters Patent are hereby corrected as shown below:

Column 1, line 12, substitute --gear-- for "gas";
Line 21, insert --art-- after "prior";
Line 29, correct the spelling of "has";
Line 30, Substitute --in-- for "is";
Line 48, substitute --systems-- for "system";

Line 67, insert --the intersection of-- after "by";

Column 2, Line 66, substitute --FIG. 10 is a plan view of a modification of the apparatus disclosed in FIG. 3; and-- for "FIG. 10 is a 2of modification 2apparatus in FIG. 3;"

Column 3, line 42, correct the spelling of "also";
Line 46, delete "of", second occurrence;

Column 4, line 4, delete "of adjacent" after"side adjacent";
Line 46, substitute --wheel's surface-- for "wheel'surface";
Line 59, substitute --abruptly-- for "abrupt";

UNITED STATES PATENT OFFICE

CERTIFICATE OF CORRECTION

Patent No. 4,143,633 Dated MARCH 13, 1979

Inventor(s) GORDON H. PECK

It is certified that error appears in the above-identified patent and that said Letters Patent are hereby corrected as shown below:

Column 5, line 10, substitute --becoming-- for "become";

Line 44, delete "=", second occurrence;

Line 49, substitute -- $+x^2$ -- at the end of the equation for "$+2x^2$" ;

Line 51, substitute -- $=r_1^2 - 2r_1 d$ -- in the middle of the equation for "$=r_1^2 - 2r_1^d$";

The last line of the last equation should read -- $\cos 45° + \frac{d}{r} - 1$ -- instead of "$\cos 45° + \frac{d}{-} - 1$".

Column 6, line 23, correct the spelling of "Applicant";

Line 55, insert --said-- after "each".

Column 8, line 8, substitute --of 0.125-- for "of0.125";

Line 35, substitute --arcs-- for "arc".

Signed and Sealed this

*Eighteenth* Day of *September 1979*

[SEAL]

*Attest:*

LUTRELLE F. PARKER

*Attesting Officer* *Acting Commissioner of Patents and Trademarks*

UNITED STATES PATENT OFFICE
CERTIFICATE OF CORRECTION

Patent No. 4,143,633 Dated March 13, 1979

Inventor(s) Gordon H. Peck

It is certified that error appears in the above-identified patent and that said Letters Patent are hereby corrected as shown below:

Column 1, line 66, delete "the intersection of".

Signed and Sealed this

*Ninth* Day of *October 1979*

[SEAL]

*Attest:*

RUTH C. MASON
*Attesting Officer*

LUTRELLE F. PARKER
*Acting Commissioner of Patents and Trademarks*